(No Model.)
W. DAWSON.
VALVE ROD AND STEM FOR STEAM ENGINES.
No. 257,477. Patented May 9, 1882.
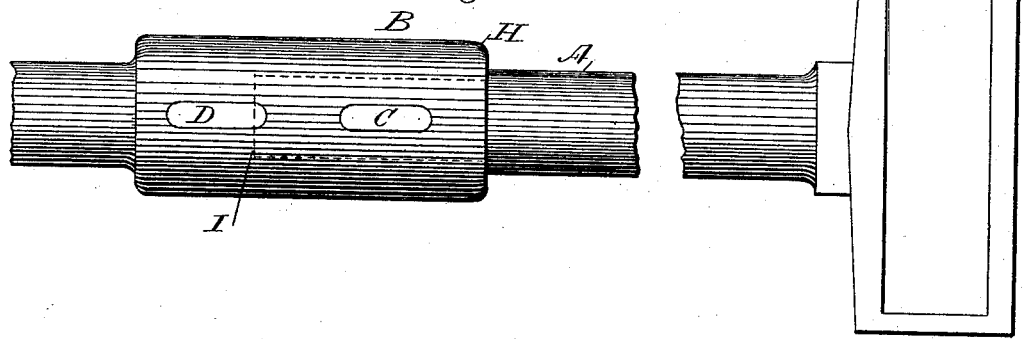
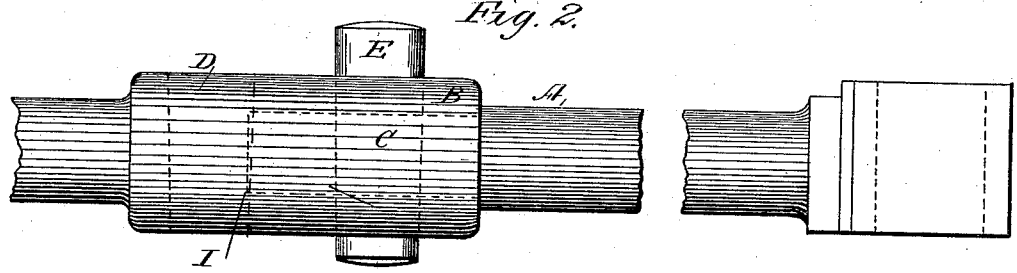
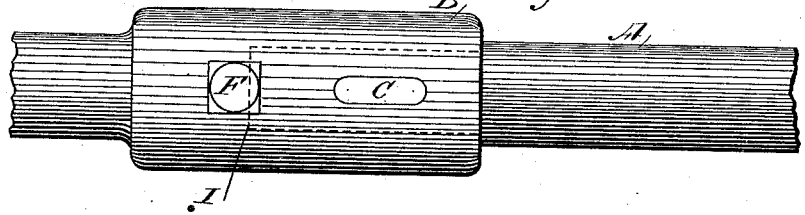
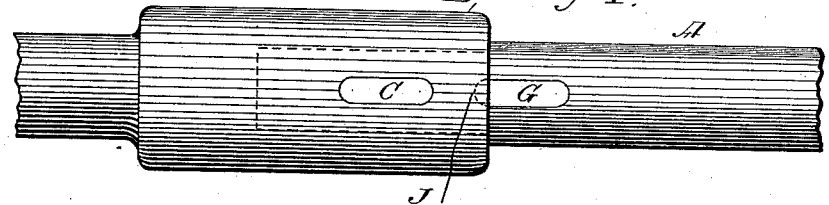
Witnesses
Rob't H Beebe
Wm A Duer
Inventor
Walter Dawson

UNITED STATES PATENT OFFICE.

WALTER DAWSON, OF SCRANTON, PENNSYLVANIA.

VALVE ROD AND STEM FOR STEAM-ENGINES.

SPECIFICATION forming part of Letters Patent No. 257,477, dated May 9, 1882.

Application filed February 18, 1882. (No model.)

*To all whom it may concern:*

Be it known that I, WALTER DAWSON, of Scranton, in the county of Lackawanna and State of Pennsylvania, have invented a new and useful Improvement in Valve-Rods and Valve-Stems of Locomotives and other Steam-Engines, of which the following is a full, clear, and exact description.

My invention consists of an improved valve-rod and valve-stem that can be easily and quickly disconnected, detached, or separated the one from the other.

Valve-rods, as ordinarily made, have one end of suitable shape and form, to connect to one of the arms of a rocker-shaft or to the link-motion or other machinery that is used to operate the valve. The other end is provided with a socket, into which the end of the valve-stem is fitted. The two parts are held together by a taper wedge or key, which passes through both the socket and the end of the stem through a hole or keyway that has been made for that purpose. Whenever it is requisite and necessary to disconnect and separate them it is found to be very difficult and destructive, is often necessary to take the cover of the steam-chest off, and with a bar of iron as a lever pull against the valve and yoke and at the same time strike the end of the socket (at H on drawing, Fig. 1) with a heavy hammer to drive it in the opposite direction, all of which occupies a great deal of time, and is expensive and annoying, and when a locomotive breaks down on the road and it is necessary to disconnect a valve-rod the delay is a very serious matter.

Reference is to be had to the accompanying drawings, forming part of this specification, in which similar letters of reference indicate corresponding parts in all the figures.

Figure 1 is a plan view. Fig. 2 is a side elevation of the socket end of a valve-rod with the valve-stem in place connected to it. Figs. 3 and 4 are plan views of the same, showing my improvement in another form.

A is the valve-stem. B is the socket of the valve-rod. C is a hole or keyway, into which the key E is driven to hold the valve in stem A securely in its place in the socket B in the usual manner. D is a second hole or keyway, that is made in the socket at such a place that the end of the valve-stem will project into it, as shown by the dotted lines at I, Figs. 1 and 2. E is a taper wedge or key, that is driven downward in the usual manner, to hold the valve rod and stem securely together. F shows a round or square hole in the socket B, instead of an oblong-shaped hole. G is a hole in the valve-stem A at such a place that the end of the socket of the valve-rod will project over and beyond a portion of it, as shown at J, Fig. 4.

Whenever it is requisite or necessary to disconnect the valve-stem A from the valve-rod socket B the key E must be driven upward and taken out of the keyway C and put into the keyway D and driven downward, which will force the end of the valve-stem outward and loosen it in the socket, so that it can be easily and quickly drawn out and separated.

On the drawings, Figs. 1, 2, and 4, the holes D and G are shown to be the same shape as the holes C, so that the key E may be used in the operation of separating the valve-stem A from the valve-rod socket B; but the holes D and G, also hole F, Fig. 3, may be made any suitable shape and form, that will admit a wedge or bolt, pin or key, for the purpose of separating the valve-stem A from the socket B.

Having thus described my invention, I claim as new and an improvement in the valve-rods and valve-stems of locomotives and other steam-engines and desire to secure by Letters Patent—

The hole in the valve-rod B, as shown at D, Figs. 1 and 2, and at F, Fig. 3, and the hole in the valve-stem A, as shown at G, Fig. 4, of any suitable shape and form that will admit a wedge or bolt, pin or key, or an equivalent, for the purpose of disconnecting or separating the valve-stem A from the socket of the valve-rod B.

WALTER DAWSON.

Witnesses:
BOBT. H. BEEBE,
WM. A. DUER.